United States Patent [19]
Speer et al.

[11] Patent Number: 5,254,162
[45] Date of Patent: Oct. 19, 1993

[54] BROWN SPINEL PIGMENTS BASED ON ZINC CHROMITE, METHOD OF THEIR PRODUCTION AND USE

[75] Inventors: Dietrich Speer; Akos Kiss, both of Hanau; Jenny Horst, Gelnhausen, all of Fed. Rep. of Germany

[73] Assignee: Degussa Aktiengesellschaft, Frankfurt am Main, Fed. Rep. of Germany

[21] Appl. No.: 946,574

[22] Filed: Sep. 18, 1992

[30] Foreign Application Priority Data

Sep. 18, 1992 [DE] Fed. Rep. of Germany ....... 4131548

[51] Int. Cl.$^5$ ............................ C09C 1/04; C09C 1/34
[52] U.S. Cl. ..................................... 106/419; 106/425; 106/453
[58] Field of Search .................. 106/419, 425, 453

[56] References Cited

U.S. PATENT DOCUMENTS

| | | | |
|---|---|---|---|
| 4,075,029 | 2/1978 | Nuss | 106/419 |
| 4,140,538 | 2/1979 | Hund et al. | 106/425 |
| 4,156,613 | 5/1979 | Hünd et al. | 106/425 |
| 4,183,758 | 1/1980 | Schiffman | 106/425 |
| 4,292,294 | 9/1981 | Patil et al. | 106/419 |
| 4,681,637 | 7/1987 | Rademachers et al. | 106/425 |
| 4,696,700 | 9/1987 | Fischer et al. | 106/453 |
| 5,080,718 | 1/1992 | Sullivan et al. | 106/453 |
| 5,167,708 | 12/1992 | Wilhelm et al. | 106/453 |

FOREIGN PATENT DOCUMENTS 384473 2/1932 United Kingdom .

OTHER PUBLICATIONS

Eppler, R.A., "Selecting Ceramic Pigments", *American Ceramic Society* (1987), vol. 66, pp. 1600–1604.

*Primary Examiner*—Helene Klemanski
*Attorney, Agent, or Firm*—Beveridge, DeGrandi, Weilacher & Young

[57] ABSTRACT

Brown spinel pigments based on zinc chromite which are iron-free and exhibit an atomic ratio of chromium to zinc in a range of 1 to greater than 0.5 up to 2 are disclosed. Preferred pigments additionally contain manganese, in which instance the atomic ratio of Mn to Cr is a maximum of 0.2. The production of the pigments involves a firing process of a powder mixture consisting of the oxides the metals, or precursors thereof, contained in the pigment. Instead of previously known grayish-brown unattractive products, attractive brown pigments are obtained by means of the selected molar ratio and a baking temperature above 1200° C. The novel pigments can be used in the presence of glass frits even at firing temperatures above 1200° C. to 1500° C. and are suitable for a common firing of ceramic carrier and decoration.

14 Claims, No Drawings

BROWN SPINEL PIGMENTS BASED ON ZINC CHROMITE, METHOD OF THEIR PRODUCTION AND USE

BACKGROUND AND INTRODUCTION

The present invention relates to novel brown spinel pigments based on zinc chromite which, in contrast to previously known pigments of this type, are iron-free. The production of the pigments of the invention is carried out in a manner which is generally known for spinel pigments but in which the baking temperature of the powder mixture is above the known range. The novel pigments can be used for ceramic decorations which can be fired or baked on in a high-temperature firing.

Spinel pigments based on zinc chromite are known; however, in many respects they do not meet the qualities desired by manufacturers of ceramic decorations. Zinc chromite of the formula $ZnCr_2O_4$ is a spinel in which the $Zn^{2+}$ ions occupy the tetrahedral positions and the $Cr^{3+}$ ions the octahedral interstices of the cubically densest packing of oxygen atoms. $ZnCr_2O_4$ is normally a greenish-gray product and is coloristically unattractive.

Spinels based on ZnO, $TiO_2$ and $Cr_2O_3$ are known from British patent 384,473. Such spinels are green. Spinels of this type can be produced by annealing a powder mixture of the oxides, the metals or precursors of the oxides at 800° to 1100° C. The powder mixture to be heat annealed can additionally contain known fluxing agents or mineralizers such as alkali halogenides or alkali sulfates.

Brown pigments are obtained by means of the insertion of iron into the spinel lattice of the zinc chromite. A disadvantage of these brown spinel pigments is their limited temperature stability in the presence of glass frits, which also applies to many other iron-containing spinels. Such pigments discolor during the firing on of decorative colors produced from them onto ceramic products with increasing firing temperature. Such pigments are therefore not satisfactorily suitable for applications which require firing temperatures above 1200° C., especially above 1300° C. to 1500° C., such as e.g. new porcelain firing methods in which the unfired ceramic carrier and a decorative layer applied onto it are fired in a single firing cycle.

SUMMARY OF THE INVENTION

An object of the present invention is to synthesize novel brown spinel pigments based on zinc chromite which exhibit an improved temperature stability in comparison to Fe-containing pigments. Raw materials which can be readily handled and are toxically as safe as possible should be able to be used during production. The pigments should be able to be used in high-temperature firing decoration methods without appreciable change in color.

According to the present invention, there is provided brown spinel pigments based on zinc chromite which are iron-free and exhibit an atomic ratio of chromium to zinc in a range of 1 to greater than 0.5 to 1 to 2. The atomic ratio of Cr to Zn is preferably in a range of 1 to 0.75 to 1 to 2 in the pigments of the invention.

DETAILED DESCRIPTION OF THE INVENTION

It is assumed that chromium is partially in the tetravalent form in the lattice of the spinels of the present invention and that zinc ions occupy positions of the chromium for the purpose of the charge equalization. Normally, the zinc oxide which is not bound in the spinel lattice does not result in any disturbances when the pigments are used. However, excess ZnO can be dissolved out or leached out of the pigment with an acid wash as required.

The pigments can additionally contain other metals in a limited amount in the spinel lattice aside from the components $Cr_2O_3$ and ZnO for modifying the shade and/or for stabilizing the shade in the case of very high firing temperatures, with the stipulation that the brown color remains preserved. The term "limited amount" denotes an atomic ratio of these other metals to chromium of a maximum of 0.2. These modifying metals are preferably manganese, but metals inserted in the spinel such as Mg, Ti, Al, Sn, Ni, Co and V can also modify the shade.

Pigments of the invention which essentially contain only $Cr_2O_3$ and ZnO exhibit a slight color shift toward green in glazes as the firing temperature increases—this can be recognized by an "a" value in the L, a, b colorimetric system which decreases and, if applicable, becomes negative. This color shift can be eliminated by means of the insertion of manganese into the spinel lattice. Especially preferred pigments of the invention contain essentially only oxides of chromium, zinc and manganese and exhibit an atomic ratio of Cr to Zn to Mn of 1:0.75 up to 2:0.01 up to 0.15.

The brown spinel pigments of the present invention based on zinc chromite can be produced by means of firing a powder mixture containing chromium(III)oxide and zinc oxide. Alternatively, the pigments can be prepared from precursors capable of forming these oxides below the firing temperature and working up the fired product in a known manner. The method is characterized in that the powder mixture contains chromium-(III)oxide and zinc oxide or precursors of these oxides in a molar ratio, calculated in each instance as $Cr_2O_3$ and ZnO, in a range of 1:greater than 1 up to 4 and is fired at a temperature above 1200° C. Generally, temperatures of about 1350° C. should not be exceeded.

In addition to the above-mentioned raw materials, the powder mixture can also contain other metal oxides or precursors of the same in a limited amount for modification and/or stabilization of the shade of color with the stipulation that the atomic ratio of the modifying metals to chromium does not exceed a value of 0.2. Potential oxides are those of e.g. Mn, Ti, Al, Mg, Sn, Ni, Co and V but in particular oxides of Mn. The term "precursors of metal oxides" denotes compounds which are converted into oxides below the firing temperature, e.g. sulfates, oxide hydrates, carbonates, oxalates.

Preferred pigments which do not exhibit any color shift to green even at the high firing temperatures of decorative systems containing these pigments and glass frits can be produced in that the powder mixture to be fired consists essentially of $Cr_2O_3$, ZnO and an Mn compound from the series MnO, $MnO_2$, $Mn_2O_3$ or a permanganate with the atomic ratio of Cr to Zn to Mn being 1:0.75 up to 2:0.01 up to 0.15. The term "essentially" signifies that the powder mixture can additionally contain mineralizers which are not inserted into the spinel lattice as well as impurities stemming from the raw materials used.

The co-usage of mineralizers in the production of the pigments is customarily not necessary and is even evaluated rather negatively in some instances. Surprisingly, hardly any chromate is formed during the firing of a powder mixture of $Cr_2O_3$, ZnO and $KMnO_4$ in the above-described ratio at the preferred firing temperature of 1250° C. to 1350° C. in an open crucible in the presence of air. The co-usage of e.g. sodium fluoride as mineralizer causes the chromate content to rise.

The firing time is a function of the firing temperature selected. A firing time of 1 to 5 hours at a firing temperature in a range of 1250° to 1350° C. is generally sufficient. The powder mixture to be fired is homogenized in a known manner prior to the firing, e.g. by means of grinding in ball mills, and then fired in open crucibles or, after having been pressed to formed materials, as such in suitable kilns. The firing can be carried out in electrochamber kilns or tunnel kilns or in kilns with another design.

After the firing process, the fired product is fed to a customary posttreatment: This includes a grinding to the desired pigment fineness, which is preferably effected by means of a wet grinding with water, e.g. in ball mills. Such a wet grinding simultaneously extracts chromate formed, if applicable, in slight concentration from the pigment. After the grinding and water wash in the known manner, the material is dried in a customary manner.

It could not have been foreseen from the state of the art that instead of the previously known unattractive, grayish-green $ZnCr_2O_4$ spinel that an attractive brown spinel pigment is obtained by means of the elevation of the firing temperature and the selection of the molar ratios of the initial components in accordance with the invention. It was also surprising that the incorporation of a small amount of manganese into the pigment distinctly increases the color stability at very high temperatures.

The novel brown spinel pigments obtainable in accordance with the method of the present invention can be used for coloring and decorating ceramic products known in the art such as porcelain, earthenware and stoneware in the presence of glass frits which are known in the art. The firing temperatures can be in the customary range of usually 700° to 1100° C. or above thereby. The temperature is a function in particular of the pigment composition and also the softening range of the glass frits present in the decoration system used. The temperature stability and glaze stability of the pigments of the present invention also permit firing temperatures above 1200° C. and especially above 1300° to 1500° C. This unexpected advantage makes it possible to also use the pigments in so-called high-temperature firing methods, in which the ceramic carrier and the decoration are fired simultaneously in a single firing procedure.

The pigments of the present invention are mixed with a compatible glass frit conventional in the art and then deposited onto a ceramic surface and fired. Suitable glass frits known in the art can be used for mixing with pigments of the invention.

The following examples are intended to illustrate the pigments of the invention and the method of their production as well as their use.

EXAMPLES

Examples 1–6: Production of the pigments

Powder mixtures of the initial substances and compositions indicated in table 1—data in % by weight relative to the powder mixture—are homogenized in a ball mill for 20 minutes. The mixtures are brought to reaction in open fireclay crucibles in an electrochamber kiln. The firing temperature is 1300° C and the firing time 3 hours. The fired products are ground up wet and the pigment dried after the water is separated off. A brown pigment is obtained in each instance.

TABLE 1

| Example | $Cr_2O_3$ | ZnO | $KMnO_4$ |
|---|---|---|---|
| 1 | 50 | 50 | — |
| 2 | 49.8 | 49.2 | 1.0 |
| 3 | 47.8 | 43.0 | 9.2 |
| 4 | 31.8 | 68.2 | — |
| 5 | 33 | 66 | 1 |
| 6 | 38.2 | 60.5 | 9.3 |

Examples 7–12: Use of the pigments a) The pigments of examples 1–6 were tested in a transparent test glaze (type No. 40260 of Degussa AG containing 50.6% $SiO_2$, 8.0% CaO, 11.2% $Al_2O_3$, 15.5% PbO, 10% $B_2O_3$, 3.2% $K_2O$) in an amount of 5% by weight; firing temperature 1060° C. The L,a,b values were determined by the CIE-Lab system according to DIN 5033; results are shown in table 2.

b) A 5% by weight pigment content was tested in the same manner as indicated above in a sanitary glaze (glass frit) essentially free of boric acid (Degussa AG, type No. 49230); firing temperature 1250° C., heating rate 150 k/h, dwell time 30 minutes. L,a,b values are shown in table 2.

TABLE 2

| Example No. | Pigment used according to example No. | L, a, b values (a) test glaze | (b) sanitary glaze |
|---|---|---|---|
| 7 a/b | 1 | L = 22.03<br>a = 2.50<br>b = 6.89 | L = 46.12<br>a = 0.39<br>b = 10.11 |
| 8 a/b | 2 | L = 19.68<br>a = 2.19<br>b = 5.98 | L = 44.02<br>a = 0.14<br>b = 9.36 |
| 9 a/b | 3 | L = 25.65<br>a = 2.72<br>b = 6.82 | L = 43.87<br>a = 1.96<br>b = 10.25 |
| 10 a/b | 4 | L = 21.82<br>a = 3.07<br>b = 6.69 | L = 55.08<br>a = −2.35<br>b = 8.51 |
| 11 a/b | 5 | L = 20.66<br>a = 2.67<br>b = 3.76 | L = 53.74<br>a = −1.16<br>b = 9.43 |
| 12 a/b | 6 | L = 15.07<br>a = 4.41<br>b = 5.54 | L = 44.20<br>a = 3.68<br>b = 9.41 |

Further variations and modifications of the foregoing will be apparent to those skilled in the art and such variations and modifications are attended to be encompassed by the claims that are appended hereto.

German Priority Application P 41 31 548.0, filed on Sep. 21, 1991, is relied on and incorporated by reference.

What is claimed:

1. A brown spinel pigment comprising zinc chromite and exhibiting an atomic ratio of chromium to zinc in a range of 1:greater than 0.5 up to 2, and wherein said brown spinel pigments are iron-free.

2. The pigment according to claim 1, wherein said atomic ratio of chromium to zinc is in a range of 1:0.75 up to 2.

3. The pigment according to claim 1, further comprising manganese and wherein the atomic ratio of manganese to chromium is a maximum of 0.2.

4. The pigment according to claim 1, consisting essentially of oxides of chromium, zinc and manganese exhibiting an atomic ratio of 1:0.75 up to 2:0.01 up to 0.15.

5. The pigment according to claim 1, further comprising at least one member selected from the group consisting of oxides of Mn, Mg, Ti, Al, Sn, Ni, Co, V, and precursors of said oxides, and wherein the atomic ratio of said member to chromium is a maximum of 0.2.

6. A method of producing the brown spinel pigment according to claim 1, said method comprising firing a powder mixture at a temperature above 1200° C. to form a fired product and working up said fired product, wherein said powder mixture comprises chromium-(III)oxide and zinc oxide or precursors of said oxides in a molar ratio, calculated in each instance as $Cr_2O_3$ and ZnO, in a range of 1:greater than 1 up to 4.

7. The method according to claim 6, wherein said powder mixture further comprises a manganese oxide or a precursor of said manganese oxide and wherein the atomic ratio of Mn to Cr is a maximum of 0.2.

8. The method according to claim 7, characterized wherein said powder mixture consists essentially of $Cr_2O_3$, ZnO and a Mn compound selected from the group consisting of MnO, $Mn_2O_3$, $MnO_2$ and Mn permanganate and wherein the atomic ratio of Cr:Zn:Mn compound is 1:0.75 up to 2:0.01 up to 0.15.

9. The method according to claim 6, wherein said baking is conducted at a temperature in a range of 1250° C. to 1350° C. for 1 to 5 hours.

10. The method according to claim 6, wherein said powder mixture further comprises at least one member selected from the group consisting of oxides of Mn, Mg, Ti, Al, Sn, Ni, Co, V, and precursors of said oxides, and wherein the atomic ratio of said member to chromium is a maximum of 0.2.

11. The method according to claim 6, further comprising grinding said fired product.

12. A colored or decorated ceramic product comprising the brown spinel pigment according to claim 1 mixed with a compatible glass frit, deposited on a ceramic carrier and fired.

13. A brown spinel pigment comprising zinc chromite and exhibiting an atomic ratio f chromium to zinc in a range of 1:greater than 0.5 up to 2, and wherein said brown spinel pigments are iron-free, wherein said brown spinel pigment is produced by a method comprising firing a powder mixture at a temperature above 1200° C. to form a fired product and working up said fired product, wherein said powder mixture comprises chromium(III)oxide and zinc oxide or precursors of said oxides in a molar ratio, calculated in each instance as $Cr_2O_3$ and ZnO, in a range of 1:greater than 1 up to 4.

14. The pigment according to claim 4, wherein said pigment is essentially free of chromate.

* * * * *